F. STONE.
LUBRICATOR.
APPLICATION FILED MAR. 22, 1920.
1,393,584.
Patented Oct. 11, 1921.
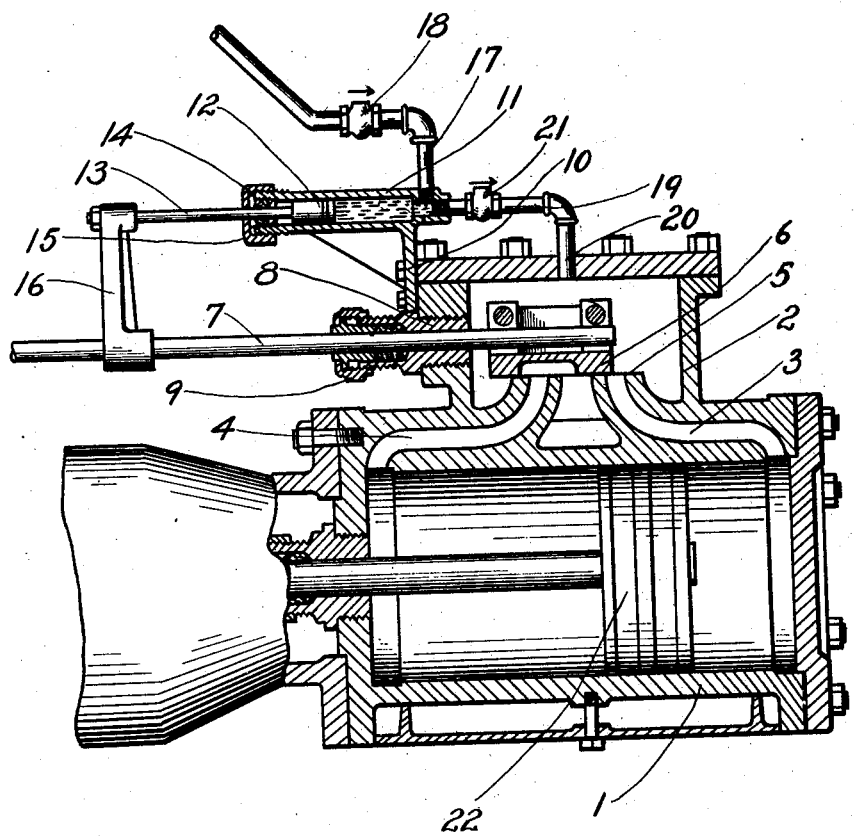
Inventor
Frank Stone.
By [signature]
Attorney

UNITED STATES PATENT OFFICE.

FRANK STONE, OF SLATER, MISSOURI.

LUBRICATOR.

1,393,584.   Specification of Letters Patent.   Patented Oct. 11, 1921.

Application filed March 22, 1920. Serial No. 367,670.

*To all whom it may concern:*

Be it known that I, FRANK STONE, a citizen of the United States, residing at Slater, in the county of Saline and State of Missouri, have invented certain new and useful Improvements in Lubricators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a forced feed lubricating system for reciprocatory engines and the invention contemplates the provision of means for introducing a lubricant at each alternate stroke of the piston, the lubricant preferably being fed into the valve chest to be distributed over the movable parts, including the D-valve, the piston rings, etc., the invention being particularly applicable in connection with locomotives although not necessarily limited thereto.

The figure in the drawings is a sectional view through a conventional form of reciprocatory engine, the valve chest, the D-valve and the pump for effecting the forced feed.

Referring to the drawings by numerals of reference:

1 designates an engine cylinder, above which is a valve chest 2 having ports 3 and 4 which alternately become the inlet and exhaust ports for the cylinder 1, as will be well understood. On the valve seat 5 is shown a conventional form of D-valve 6 having a valve stem 7 projecting through the threaded stem 8 of a gland or packing, including an adjusting nut 9 whereby the steam chest may be prevented from leaking.

Secured to the steam chest is a bracket member 10, carrying a pump cylinder 11, in which is a piston 12 provided with a piston rod 13 projecting through a packing 14 and through the adjusting nut 15 on the end of the cylinder 11. The valve stem 7 and the piston rod 13 are connected by a cross head 16, as clearly shown.

The inlet to the pump communicates with a pipe 17, having a check valve 18 therein opening in the direction of the arrow and said pipe is adapted to be connected to a hydrostatic lubrication system on the locomotive, said system constituting the source of lubricant supply to the pipe 17, although the invention is not necessarily limited to the inclusion of the particular type of lubrication system. The cylinder is also connected to a pipe 19, communicating at 20 with the valve chest of the engine and said pipe 19 is provided with a check valve 21, opening in the direction of the arrow or toward the steam chest.

The motion for the pump can be taken directly off the valve stem 7 through the medium of the cross head 16 to which the rod 13 is secured; therefore, when the valve 6 is moving in one direction, for example, from right to left, the pump piston 12 will be moving during its intake stroke, that is, the valve 18 will be unseated and lubricant will be drawn into the pump cylinder 11, the valve 21, during this time, being closed.

When the valve 6 is reversing its movement, that is, moving from left to right, the piston 12 will be moving during its ejecting stroke; that is, the lubricant which has been drawn into the cylinder 11 will, during this time, be ejected through pipe 19, the valve 21 being open.

Therefore, at each alternate stroke of the piston 22 and consequently, at each alternate stroke of the valve 6 lubricant will be ejected into the valve chest, thereby keeping the parts constantly lubricated and by reducing the wear and friction, reduce the cost of coal consumption in maintaining the engine to the proper power standard.

It will be apparent from the foregoing that the lubricating system may be readily installed upon existing types of locomotives without materially changing the construction thereof, and that the invention will be effective in efficiently lubricating the valve cylinder rings and coöperating parts without materially enhancing the cost of the engine and without effecting its construction.

What I claim and desire to secure by Letters-Patent is:

1. In combination with the valve chest of a reciprocatory engine and a hydrostatic lubrication system, of a pump, the inlet of which is connected to the hydrostatic lubrication system and the outlet to the valve chest of the engine, and means movable in response to movement of the valve in the valve chest for operating said pump to alternately draw in lubricant from the hydrostatic lubrication system and expel it into the valve chest.

2. The combination with the valve chest of a reciprocatory piston engine, of a cylinder above the valve chest having a hydrostatic lubricator inlet and an outlet communicating with the valve chest, and a charge-measuring piston in the cylinder and moving in synchronism with the valve in the valve chest.

In testimony whereof I affix my signature.

FRANK STONE.